United States Patent
Cao et al.

(10) Patent No.: US 12,100,894 B2
(45) Date of Patent: Sep. 24, 2024

(54) GRADIENT INDEX METAMATERIAL LENS FOR TERAHERTZ RADIATION

(71) Applicant: IHP GmbH—Innovations for High Performance Microelectronics/Leibniz-Institut für Innovative Mikroelektronik, Frankfurt (DE)

(72) Inventors: Zhibo Cao, Frankfurt (DE); Mehmet Kaynak, Frankfurt (DE); Mattias Wietstruck, Frankfurt (DE); Matteo Stocchi, Frankfurt (DE)

(73) Assignee: IHP GMBH—INNOVATIONS FOR HIGH PERFORMANCE MICROELECTRONICS / LEIBNIZ-INSTITUT FÜR INNOVATIVE MIKROELEKTRONIK, Frankfurt (DE)

( * ) Notice: Subject to any disclaimer, the term of this patent is extended or adjusted under 35 U.S.C. 154(b) by 281 days.

(21) Appl. No.: 17/762,892

(22) PCT Filed: Sep. 24, 2020

(86) PCT No.: PCT/EP2020/076771
§ 371 (c)(1),
(2) Date: Mar. 23, 2022

(87) PCT Pub. No.: WO2021/058672
PCT Pub. Date: Apr. 1, 2021

(65) Prior Publication Data
US 2022/0368024 A1     Nov. 17, 2022

(30) Foreign Application Priority Data
Sep. 24, 2019  (EP) .................................... 19199320

(51) Int. Cl.
| | |
|---|---|
| *H01Q 15/10* | (2006.01) |
| *G02B 1/00* | (2006.01) |
| *H01Q 19/06* | (2006.01) |

(52) U.S. Cl.
CPC ............. *H01Q 15/10* (2013.01); *G02B 1/002* (2013.01); *H01Q 19/062* (2013.01)

(58) Field of Classification Search
CPC .............................. G02B 1/002; H01Q 19/062
See application file for complete search history.

(56) References Cited

U.S. PATENT DOCUMENTS 9,772,476 B2 *   9/2017  Jeong ............... B29D 11/00028
11,782,212 B1 *  10/2023  Wu ....................... G02B 6/1225
                                                         385/28

(Continued)

FOREIGN PATENT DOCUMENTS

| CN | 204029962 U | 12/2014 |
| WO | 2009/063384 A1 | 5/2009 |

OTHER PUBLICATIONS

European Search Report dated Mar. 16, 2020 issued by the EPO in corresponding EP Application No. 19199320, 11 pages.

(Continued)

*Primary Examiner* — Hugh Maupin
(74) *Attorney, Agent, or Firm* — Ware Fressola Maguire & Barber LLP

(57) ABSTRACT

A lens for terahertz radiation, which can be used in an antenna arrangement, comprises a cylindrical lens body made of silicon having a planar front surface and a planar back surface. The lens body has a front body region which forms a silicon metamaterial with a relative permittivity that decreases in a lateral direction with increasing radial distance from a cylinder axis. A back body region is immediately adjacent to the front body region and extends to the back surface. It consists of bulk silicon having a laterally (Continued)

constant relative permittivity. The front body region comprises holes that are distributed on the front surface in rings that are concentric with respect to the cylinder axis. The holes extend from the front surface to respective hole bottoms at an equal bottom level in a depth direction. The hole bottoms interface with the back body region.

11 Claims, 11 Drawing Sheets

(56) References Cited

U.S. PATENT DOCUMENTS

| | | | |
|---|---|---|---|
| 2010/0301217 | A1 | 12/2010 | Sertel et al. |
| 2015/0247960 | A1* | 9/2015 | Kildishev ............... G02F 1/397 |
| | | | 359/741 |
| 2018/0275321 | A1* | 9/2018 | Kamali ............. G02B 27/4211 |
| 2019/0178720 | A1* | 6/2019 | Padilla ..................... H04N 5/33 |
| 2020/0018874 | A1* | 1/2020 | Chisum ................. H01Q 15/10 |

OTHER PUBLICATIONS

PCT International Search Report and Written Opinion dated Dec. 16, 2020 issued in corresponding Application No. PCT/EP2020/076771, 11 pages.

Manafi et al.: "Design of a Perforated Flat Luneburg Lens Antenna Array for Wideband Millimeter-Wave Applications", 2019 13th European Conference on Antennas and Propagation (EUCAP), European Association on Antennas and Propagation, Mar. 31, 2019, pp. 1-5.

Bai et al.: "A Compact, Wide Field-of-View Gradient-Index Lens Antenna for Millimeter-Wave MIMO on Mobile Devices", 2017 IEEE 86th Vehicular Technology Conference (VTC-Fall), IEEE, Sep. 24, 2017, pp. 1-4.

Garcia et al.: "Silicon micromachined high-contrast artificial dielectrics for millimeter-wave transformation optics antennas", 2017 IEEE International Symposium on Antennas and Propagation & USNC/URSI National Radio Science Meeting, IEEE, Jul. 9, 2017, pp. 1971-1972.

Jain et al.: "Flat-lens design using Field Transformation and its comparison with those based on Transformation Optics and Ray Optics", IEEE Antennas and Wireless Propagation Letters 12, May 2, 2013, 4 pages.

Park et al.: : Subwavelength silicon through-hole arrays as an all-dielectric broadband terahertz gradient index metamaterial, Applied Physics Letters 105, 091101 (2014), 4 pages.

Office Action, EP Application No. 19199320, mailed Jun. 9, 2023, 8 pages.

Petosa et al.: "Design and performance of a perforated dielectric Fresnel lens", IEE Proc .-Microwaves, Antennas Propagation, vol. 150, No. 5, Aug. 29, 2003 (6 pages).

* cited by examiner

GRADIENT INDEX METAMATERIAL LENS FOR TERAHERTZ RADIATION

CROSS REFERENCE TO RELATED APPLICATIONS

This application is the U.S. National Stage of International Application No. PCT/EP2020/076771 filed on Sep. 24, 2020, which application claims priority under 35 USC § 119 to European Patent Application No. 19199320.3 filed on Sep. 24, 2019, both of which are hereby incorporated by reference in their entirety.

TECHNICAL FIELD

The present invention relates to a lens for terahertz radiation, a terahertz antenna arrangement and a method for fabrication a lens for terahertz radiation.

BACKGROUND OF THE INVENTION

Optical lenses for terahertz radiation are known. Typically, they have convex or concave surfaces and are relatively thick, around 20 mm, which make it difficult to integrate them into imaging, e.g. sensors, or communication, e.g. wireless communication, devices.

Metamaterial lenses have been contributed to major advances in gradient index optics. Gradient index optics achieves optical effects produced by a gradient of the refractive index of a material. Lenses using gradient index optics have the advantage, that they can be produced as flat surface lenses. It is known, that lenses covering gradient index optical effects reduce aberrations compared to optical lenses.

A gradient index lens using metamaterials for terahertz radiation is known from CN 204029962 U. The lens is a multilayer structure comprising hundreds of layers stacked on top of each other. Each layer of the metamaterial lens forms a metamaterial of its own, having an individual distribution of holes that differs from that of its neighboring layers.

It would be desirable to provide a metamaterial lens for terahertz radiation that allows a focus of increased intensity, i.e., surface power density's.

SUMMARY OF THE INVENTION

The present invention provides a lens for terahertz radiation, an antenna arrangement and a method for fabrication a lens for terahertz radiation.

According to the first aspect of the invention a lens for terahertz radiation according to claim 1 is proposed. The lens comprises:
- a cylindrical lens body made of silicon having a planar front surface and a planar back surface; wherein the lens body has
- a front body region which forms a silicon metamaterial with a relative permittivity that decreases in a lateral direction, which is parallel to the front surface, with increasing radial distance from a cylinder axis; and
- a back body region that is immediately adjacent to the front body region, extends to the back surface, and consists of bulk silicon having a laterally constant relative permittivity; and wherein
- the front body region comprises holes that are distributed on the front surface in rings that are concentric with respect to the cylinder axis, wherein the holes extend from the front surface to respective hole bottoms at an equal bottom level in a depth direction, which is perpendicular to the front surface, the hole bottoms interfacing with the back body region.

The lens according to the first aspect achieves a focus of increased intensity by reducing losses for the terahertz radiation propagating through the lens.

The reduction of losses is achieved by a front body region that comprises holes that extend from the front surface to respective hole bottoms at an equal bottom level in a depth direction for all holes, which is perpendicular to the front surface, wherein the hole bottoms inter-face with the back body region. In other words, the holes in the front body region extend from the front surface of the lens body all the way to the interface of the front body region and the back body region.

Furthermore, the back body region consists of bulk silicon. This way, the back body region not only serves mechanical stability of the lens, but at the same time functions as a spacer, which allows radiation generated by an antenna and entering the lens from the back surface to develop a wave form that is most suitable for focusing in the front body region of the lens. The use of silicon also improves the performance of the lens in that it helps achieving particularly low losses, in particular, if pure silicon is used. Regarding a definition of pure silicon, as is per se known, pure silicon is an insulator at room temperature. In other words, the back body region in the lens of the present invention achieves a particularly good coupling between an antenna and the metamaterial in the front body regions.

The lens design of the present invention allows attachment to an antenna without changing its focusing characteristics in the attachment process. In known concepts, an additional spacer is needed to achieve a good focusing effect, because there should be an enough distance between antenna and lens. However, this prior art concept of using a spacer risks inaccuracies of mutual position between the lens and the spacer in an antenna arrangement, which deteriorates the performance of the lens-antenna arrangement. In contrast, no such inaccuracies occur by using the lens design of the present invention. Furthermore, the use of silicon in the back body region achieves a high permittivity and allows using a rather small distance between the metamaterial and the antenna. In other words, the back body region can be fabricated with a rather low thickness.

The back body region also achieves an improved fabrication process of an antenna arrangement compared to known processes. For example, the inventive lens can be attached to an antenna, for instance by glueing, with a particular high strength of connection because the area of interconnection between the lens and the antenna is particularly high. For the lens is attached to an antenna with the bulk back body region facing the antenna, and not with a back face having holes as in known lens designs.

Finally, antenna arrangement designs that do not make use of a spacer and that lack the back body region of the lens of the present invention suffer in performance after attachment of the antenna to the lens by glueing because glue used for the attachment penetrates through the holes of the lens. This problem of known lens designs is overcome by the lens of the present invention.

The lens of the present invention is based further on the recognition that silicon has particularly suitable optical properties for operating wavelengths in the terahertz range.

The lens is made of a single silicon body, which further decreases absorption losses due to multiple layer structure. Thus, the object to be imaged is less degraded.

The lens is made of a cylindrical body. The cylindrical lens body has the same cross-sectional layout for all radial directions with increasing radial distance from a cylinder axis, which allows focusing radiation impinging from any direction reaching a given aperture of the lens at the same predetermined focal length. Thus, the incoming radiation is focused at one focal point.

In the following, embodiments of the lens will be described.

In preferred embodiments of the lens, the holes have a square-shaped perimeter. Typically, the side length of the square-shaped perimeter of the holes is smaller than an operating wavelength of incident radiation. As is per se known, electromagnetic metamaterials affect electromagnetic waves interacting with its structural features. The extension of the structural features are much smaller than the wavelength and achieve an effect of a homogeneous material that can be described by an effective refractive index. Suitably the structural features are smaller than one quarter of the wavelength. In the case of terahertz radiation, the holes of the lens are preferably in the micrometer range, e.g. between 20 and 100 micrometer, to achieve the advantage of metamaterial effects. Such embodiments of the lens can increase an radiation intensity at the focal point of the lens.

In another embodiment of the lens, the holes are arranged in the rings in accordance with a two-dimensional lattice structure, wherein the lattice structure is composed of concentric rings divided into ring segments, each ring segment forming a unit cell of the lattice and comprising a single hole arranged concentrically with respect to the given unit cell. In other words, ring segments are defined as segments of the concentric rings and have equal surface area and equal shape. A single hole is arranged concentrically with respect to such surface area. Due to the cylindrical shape of the lens, the total ring area of a ring increases with increasing distance of the ring to the cylinder axis in lateral direction. As a result of the equal surface area and equal shape of the ring segments, rings that are closer to the cylinder axis comprise less ring segments than rings that are further away from the cylinder axis.

In an alternative embodiment the holes have a perimeter, which forms a ring segment-shaped perimeter with smaller lateral dimensions as the ring segment.

Also the holes with a ring segment-shaped perimeter are arranged concentrically with respect to the given ring segment.

In general, thickness and diameter of the lens are variable parameters. Preferably, a thickness and a diameter of the lens body are equal or nearly equal, e.g. 1 mm for the diameter and 1.4 mm for the thickness, to increase intensity of the focal point of the lens.

In a different embodiment of the lens of this kind, the thickness and the diameter are between 100 micrometer and 1 millimeter.

It has been observed that the lens performance is particularly high when the front body region and the back body region have similar thickness. Thus, the thickness of the front body region and of the back body region are preferably equal, or, in some embodiments, are nearly equal, e.g. 600 µm for the front body region and 800 µm for the back body region.

A preferred thickness for the back body region for a given operating frequency of the radiation is a thickness, which is similar, i.e., at least approximately equal to the operating wavelength. In other words, the thickness of the back body region of the lens is preferably thick enough to allow the radiation, which enters the lens from the back surface, developing a wave form that enables the front body region of the lens to focus the radiation of the operating frequency.

In another embodiment of the lens, a hole filling factor increases in the lateral direction with increasing radial distance from the cylinder axis. Generally, the hole filling factor of a given part of the volume of the front body region is a measure for a hole density in terms of a total volume assumed by holes in the considered part of the volume, divided by the considered part of the volume. Thus, the hole filling factor increases with increasing hole density. Suitably, the considered parts of the volumes are the concentric rings in the front body region, which comprise the holes.

The hole filling factor influences the relative permittivity. The relative permittivity decreases with increasing hole filling factor. Preferably, the relative permittivity decreases from 11.7 to 5.0 with increasing radial distance from the cylinder axis.

Generally, the hole filling factor in a ring is determined as the ratio between the total volume assumed by holes in a given ring and the total volume of the given ring. Equivalently, the hole filling factor can be calculated as the ratio between the volume assumed by a hole in its respective ring segment and the volume assumed by bulk silicon material in the respective ring segment.

The shape of the hole perimeter affects the hole filling factor and thus is a design parameter that can be used to control the refractive index. For example, in embodiments that comprise circular shaped holes a maximum hole filling factor of 0.74 can be achieved. This means that 74% of the front surface is covered by holes. However, for a given area, circular shaped holes only achieve a maximum coverage of 78.5% of the maximum area that can be covered by square-shape holes. Thus, in comparison, square-shaped hole can achieve higher maximum hole filling factors and are therefore preferred over circular-shaped holes.

Further, the lens focusses radiation depending on the change of the relative permittivity across the front body of the lens. In particular, for example, the focal length depends on a spatial dependence of the relative permittivity in the radial direction.

In a different embodiment of the lens of this kind, the increase of the hole filling factor ff follows the following equation:

$$ff = 1 - \frac{\left\{\left[\varepsilon_1 + (\varepsilon_2 - \varepsilon_1) \cdot \left(\frac{x \cdot w}{r}\right)^v - 1\right]\right\}}{\varepsilon_2 - 1},$$

wherein $\varepsilon_1$ and $\varepsilon_2$ are relative permittivities air ($\varepsilon_1$) and of silicon ($\varepsilon_2$), respectively, x is an ordering number of a given concentric ring among the total set of rings, w is a width of the concentric rings, r is a radius of the lens and v is a parameter between 0.3 and 2.

With this equation the variation of the hole filling factor for every concentric ring can be determined for given relative permittivities, concentric ring width and lens radius. The determined variation of the hole filling factor allows defining ring segments and hole location on the front surface. Thus, based on this equation the inventive lens can be designed.

According to a second aspect of the invention, a terahertz antenna arrangement comprises a terahertz antenna and a lens for terahertz radiation according to the first aspect of the invention or one of its embodiments arranged on the antenna, wherein the back surface of the lens faces the antenna.

The structure of the lens allows a simple alignment of the lens on top of the antenna. In particular, the back body region of a given lens provides a fixed, non-variable thickness that saves any alignment requirements with respect to a suitable distance of the lens from the antenna for focusing, i.e., developing a wave form that enables the front body region of the lens to focus the terahertz radiation on the antenna. Thus, the lens has to be aligned only in horizontal direction on top of the antenna. For example, an automated tool can be used for alignment and bonding of the lens onto the antenna. This makes production simple and cost-effective.

Different embodiments of the antenna arrangement comprise a respective different type of the terahertz antenna. For instance, any type of terahertz patch antenna can be used in combination with the lens in the antenna arrangement. In one embodiment, the terahertz antenna is a bow-tie antenna.

According to a third aspect of the invention a method for fabricating a lens for terahertz radiation is provided. The method comprises:
fabricating a cylindrical lens body made of silicon having a planar front surface and a planar back surface; wherein fabricating the lens body comprises
fabricating a silicon metamaterial in a front body region of the lens body, the silicon metamaterial having a relative permittivity that decreases in a lateral direction, which is parallel to the front surface, with increasing radial distance from a cylinder axis; wherein
fabricating the silicon metamaterial in the front body region comprises fabricating holes that are distributed on the front surface in rings that are concentric with respect to the cylinder axis, wherein the holes extend from the front surface to respective hole bottoms at an equal bottom level in a depth direction, which is perpendicular to the front surface, the hole bottoms defining an interface with a back body region; thus at the same time fabricating the back body region which is immediately adjacent to the front body region, extends to the back surface, and consists of bulk silicon having a laterally constant relative permittivity.

The method of the third aspect shares the advantages of the terahertz lens of the first aspect. In addition, the process of fabricating the silicon metamaterial in the front body region of the lens body at the same time results in a fabrication of the back body region, which consists of bulk silicon. Thus, the fabrication process fits into a standard wafer processing and assembly technique. This allows producing the lens in a simple and cost-effective manner.

In a preferred embodiment, fabricating a silicon metamaterial in the front body region comprises performing an anisotropic dry etching step for fabricating the holes in the top body region.

The anisotropic dry etching step for fabricating the holes forms a precise, comparatively simple and cost-effective way for fabricating the holes, in comparison to often used laser-based fabrication methods.

Achieving an equal bottom level in a depth direction for the holes with anisotropic dry etching is possible with a particularly high precision where a low aspect ratio between the side length of the perimeter of the holes and the distance of the bottom level in depth direction from the front surface.

BRIEF DESCRIPTION OF THE DRAWINGS

In the following, further embodiments will be described with reference to the enclosed drawings. In the drawings.

The drawings are not intended to represent the illustrated embodiments true to scale. Rather, for ease of explanation, the drawings are executed in schematized form.

DETAILED DESCRIPTION

Figure 1:
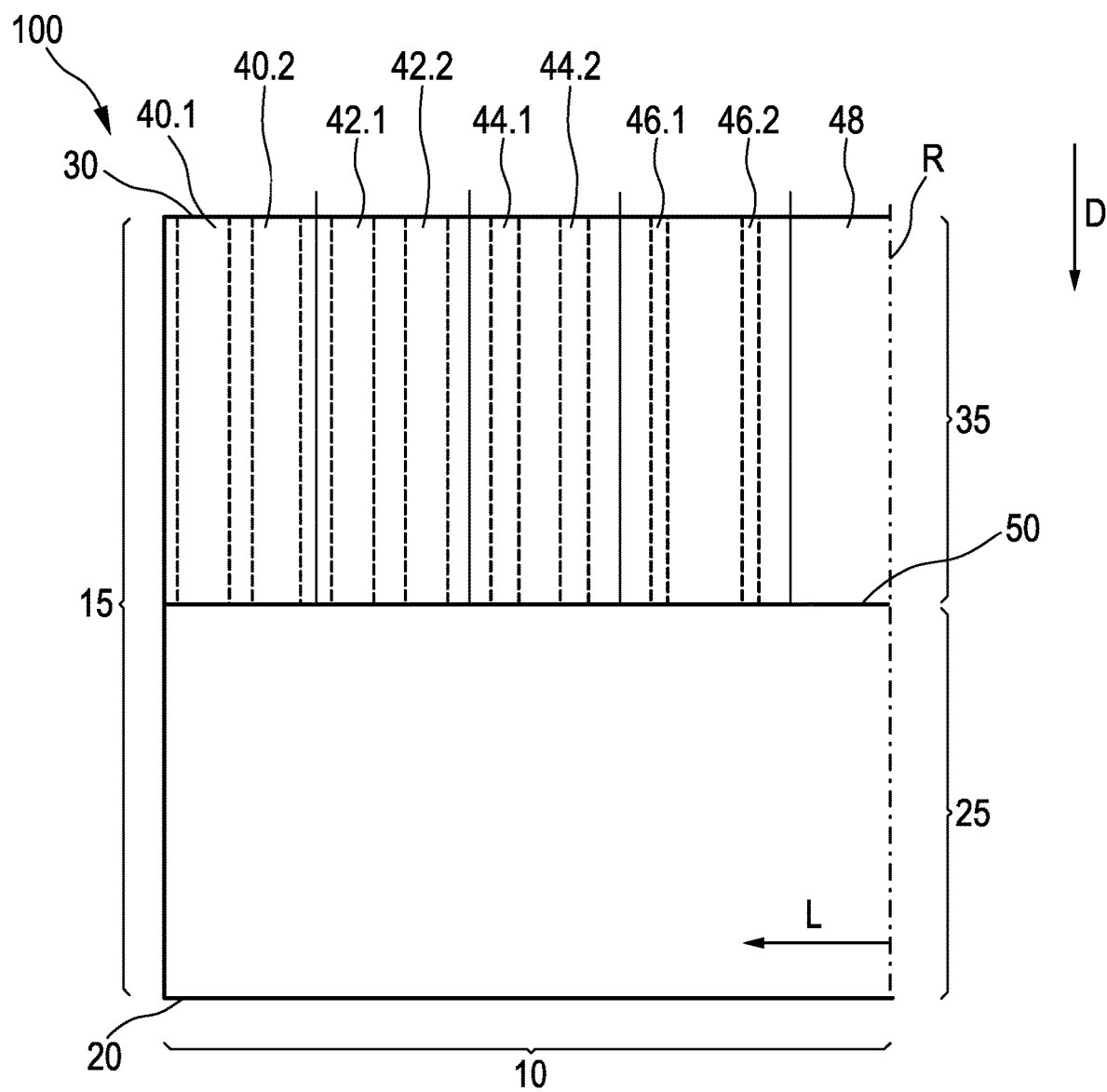
FIG. 1 shows a cross-sectional view of an embodiment of a lens for terahertz radiation.
Figure 2:
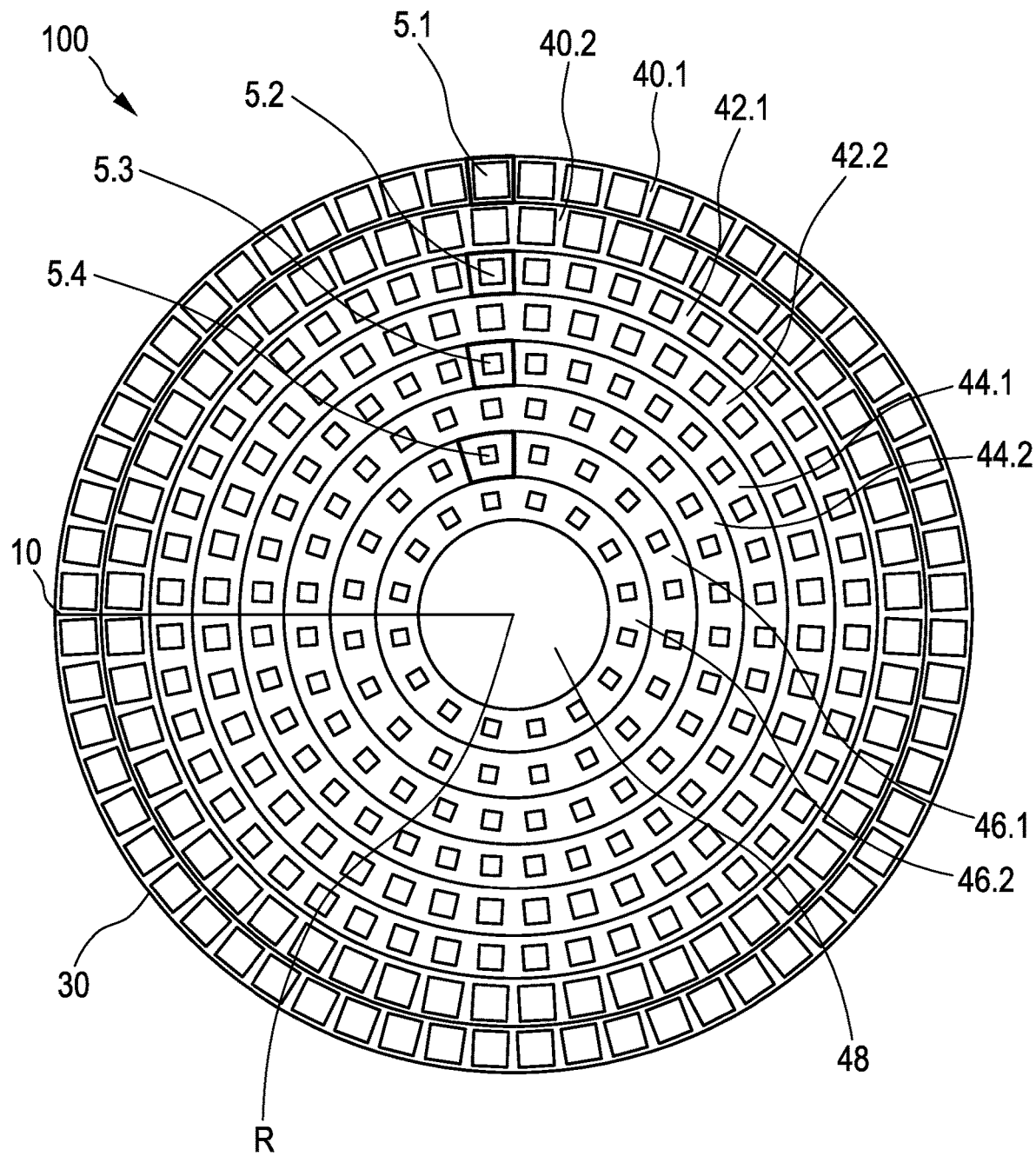
FIG. 2 shows a top-view of the embodiment for FIG. 1 for illustrating an exemplary hole distribution and hole shape for use in a lens for terahertz radiation.
Figure 3:
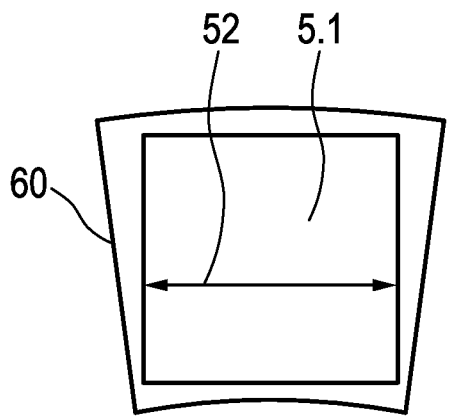
FIG. 3 shows a detail of the top view of FIG. 2, comprising a ring segment with a first hole.
Figure 4:
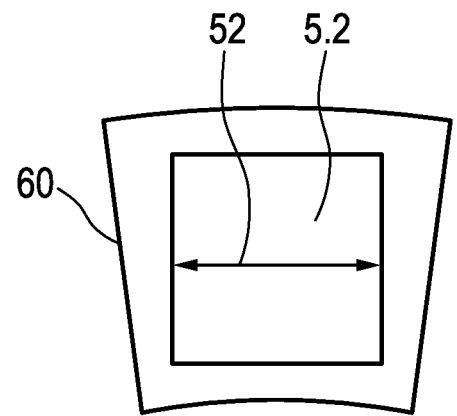
FIG. 4 shows a detail of the top view of FIG. 2, comprising a ring segment with a second hole.
Figure 5:
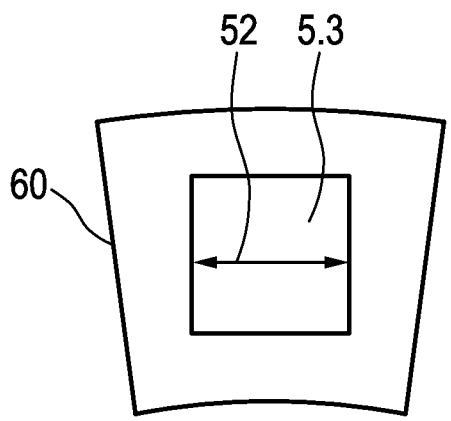
FIG. 5 shows a detail of the top view of FIG. 2, comprising a ring segment with a third hole.
Figure 6:
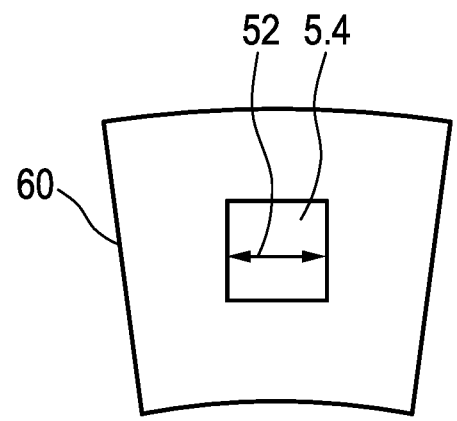
FIG. 6 shows a detail of the top view of FIG. 2, comprising a ring segment with a fourth hole.

In the following reference is made in parallel to FIGS. 1 to 6. FIG. 1 schematically shows a cross-sectional view of an embodiment of the lens 100 for terahertz radiation. FIG. 1 shows the cross-sectional view along the radius 10 of the lens 100. FIG. 2 shows a top-view of an embodiment of the lens 100 for terahertz radiation and an exemplary hole distribution and hole shape. FIG. 3 shows a first hole 5.1, FIG. 4 shows a second hole 5.2, FIG. 5 shows a third hole 5.3, FIG. 6 shows a fourth hole 5.4 of the embodiment of FIG. 1.

The lens 100 has a cylindrical lens body 15 with planar front surface 30 and a planar back surface 20. Further, the lens 100 has a front body region 35 and a back body region 25.

The front body region 35 forms a silicon metamaterial with a relative permittivity that changes in a lateral direction L with increasing radial distance from a cylinder axis R. The lateral direction L is parallel to the front surface 30. The back body region 25 is immediately adjacent to the front body region 35 and extends to the back surface 20. The back body region 25 is made of bulk silicon and has a laterally constant relative permittivity. The thickness of the front body region 35 and the thickness of the back body region 25 of the lens 100 are equal in the present embodiment. For instance, a suitable thickness of the front body region is 600 μm. It not essential to provide the front body region 35 and the back body region 25 with equal thickness.

The silicon metamaterial formed by the front body region 35 comprises holes 5.1 to 5.4 that are distributed in eight rings 40.1, 40.2, 42.1, 42.2, 44.1, 44.2, 46.1, 46.2, as visible on the front surface 30. The rings are concentric with respect to the cylinder axis R. In the present embodiment, pairs of neighboring rings have respective identical hole distributions. Specifically, with reference to FIG. 2, the hole distribution is respectively identical in ring pairs 40.1 and 40.2, 42.1 and 42.2, 44.1 and 44.2, and in the ring pair 46.1 and 46.2, with the hole density increasing in lateral direction L with increasing distance of the ring pairs from the cylinder axis R. A center region 48 around the cylinder axis R is circular shaped and does not comprise holes.

The holes 5 extend in a depth direction D from the front surface 30 to respective hole bottoms at an equal bottom level 50 that forms an interface with the back body region 25. The depth direction D is perpendicular to the front surface 30 and the lateral direction L.

A suitable value of the radius 10 is 1 mm and a suitable width of the concentric rings in the lateral direction L is 500 μm. The relative permittivity in the center region 49 is 11.7, and the relative permittivity in the outermost rings 40.1 and 40.2 is 5.

In the top view shown in FIG. 2 the front surface 30 of the cylindrical lens body is visible. The holes 5 arranged on the front surface 30 have a square-shaped perimeter. A side length 52 of the square-shaped perimeter of the holes 5 is suitably selected smaller than an operating wavelength of incident radiation for which the lens is designed. The smallest holes in the rings 46.1 and 46.2 have a side length of 33.5 μm. A side length of the holes in the rings 44.1 and 44.2 is 43 μm, in the rings 42.1 and 42.2 is 56 μm and in the rings 40.1 and 40.2 is 80 μm.

As mentioned, the hole density on the front surface 30 increases in the lateral direction L with increasing distance from the cylinder axis R. Unit cells 60 from the rings 40.1, 42.1, 44.1, 46.1 are shown separately in FIGS. 3 to 6. The hole 5.1 has a larger side length 52 than the hole 5.4. The hole side length 52 increases from hole 5.4 to hole 5.1. Thus, with increasing hole density on the front surface 30 a hole filling factor is increasing. The hole filling factor is a measure of the ratio between the volume assumed by the holes in the front body region 35 and the volume assumed by bulk silicon material in the front body region 35. The hole filling factor directly influences the relative permittivity of the front body region 35: the larger the hole filling factor is, the smaller is the relative permittivity. As a result, the relative permittivity of the lens 100 decreases in the lateral direction L with increasing radial distance from the cylinder axis R.

The holes 5 are distributed in the rings 40.1, 40.2, 42.1, 42.2, 44.1, 44.2, 46.1, 46.2 in accordance with a two-dimensional lattice structure. The lattice structure is portioned into two-dimensional unit cells 60 which divide the rings 40.1, 40.2, 42.1, 42.2, 44.1, 44.2, 46.1, 46.2 into ring segments. In other words, the concentric rings of the lattice structure are each divided into ring segments that each form a unit cell 60 which is identical for all rings. In particular, the unit cells 60 all have an equal surface area and an equal shape. Each unit cell 60 comprises a single hole 5.1, 5.2, 5.3, 5.4, which is arranged concentrically within the given unit cell 60. Thus, for example, the hole 5.1 is arranged concentrically with respect to the unit cell 60.

The equal surface area and equal shape of the unit cells 60 allows arranging one unit cell adjacent to other unit cells such that they cover a total ring area of the rings 40.1, 40.2, 42.1, 42.2, 44.1, 44.2, 46.1, 46.2. The total ring area of a ring increases with increasing distance in lateral direction L to the cylinder axis R due to the cylindrical shape of the lens 100. As a result, fewer unit cells 60 are arranged in a ring, e.g. 46.1, that has a closer distance in lateral direction L to the cylinder axis R than in rings, e.g. 40.1, that have a larger distance in lateral direction L to the cylinder axis R.

Arranging the holes in unit cells of the rings allows a precise control of the distribution of the hole filling factor over the rings 40.1, 40.2, 42.1, 42.2, 44.1, 44.2, 46.1, 46.2 in the design of the lens. The respective hole filling factor is calculated as the ratio between the volume assumed by the hole 5.1, 5.2, 5.3, 5.4, respectively, in the unit cell 60 and the volume assumed by bulk silicon material in the unit cell 60.

In a given ring pair, the hole filling factor is equal. For that reasons, for example, the number of holes in the ring 40.1, is larger than in the ring 40.2. Thus the number of holes increases with increasing distance in lateral direction L to the cylinder axis R, even though the hole filling factor is identical in two rings of a given pair.

Figure 7:
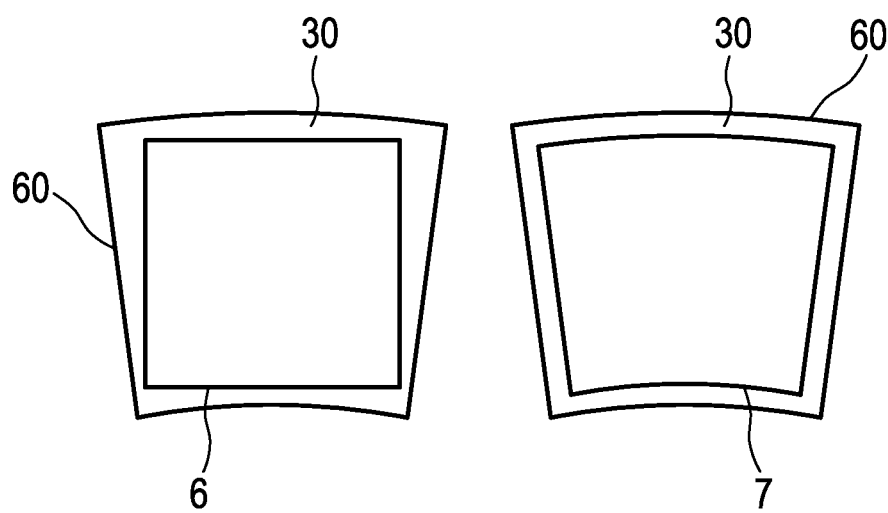
FIG. 7 shows different variants of hole shapes for use in different embodiments of the lens for terahertz radiation.

FIG. 7 shows two different variants of hole shapes of the lens 100 for terahertz radiation shown in FIGS. 1 and 2. As explained, unit cell 60 is identical in both variants.

In a first variant, a hole 6 has a square-shaped perimeter. The square-shaped hole 6 is arranged concentrically with respect to its unit cell 60. This variant of hole shapes is already explained in FIGS. 1 and 2. In comparison, a circular-shaped hole perimeter would in the present case not fulfill filling-factor requirements, leading to an insufficient variation between the inner rings of the lens (where the relative permittivity is 11.7) and the outer ones (where the relative permittivity should be as low as possible).

In a second variant, a hole 7 has a unit cell-shaped perimeter with smaller lateral dimensions as the unit cell 60. The hole 7 with a unit cell-shaped perimeter is arranged concentrically with respect to the unit cell 60.

Both variants of the holes 6, 7 are suitable for the lens 100 of FIGS. 1 and 2.

More generally, the hole shapes for the lens 100 determine a hole filling factor for the ring they belong to. In preferred embodiments, the hole filling factor ff of the respective rings across the extension in the lateral direction L follows the following equation, which was explained in detail hereinabove:

$$ff = 1 - \frac{\left\{\left[\varepsilon_1 + (\varepsilon_2 - \varepsilon_1) \cdot \left(\frac{x \cdot w}{r}\right)^v - 1\right]\right\}}{\varepsilon_2 - 1}.$$

With this equation the hole filling factor for each ring can be calculated for given relative permittivities, lens radius r and ring width w.

The profile of the relative permittivity across the lateral extension of the lens 100 determines the focusing characteristics of the lens 100, in particular the focal length. Thus, the focusing characteristics of the lens can be designed using the above formula for hole filling factors in the respective rings.

Figure 8:
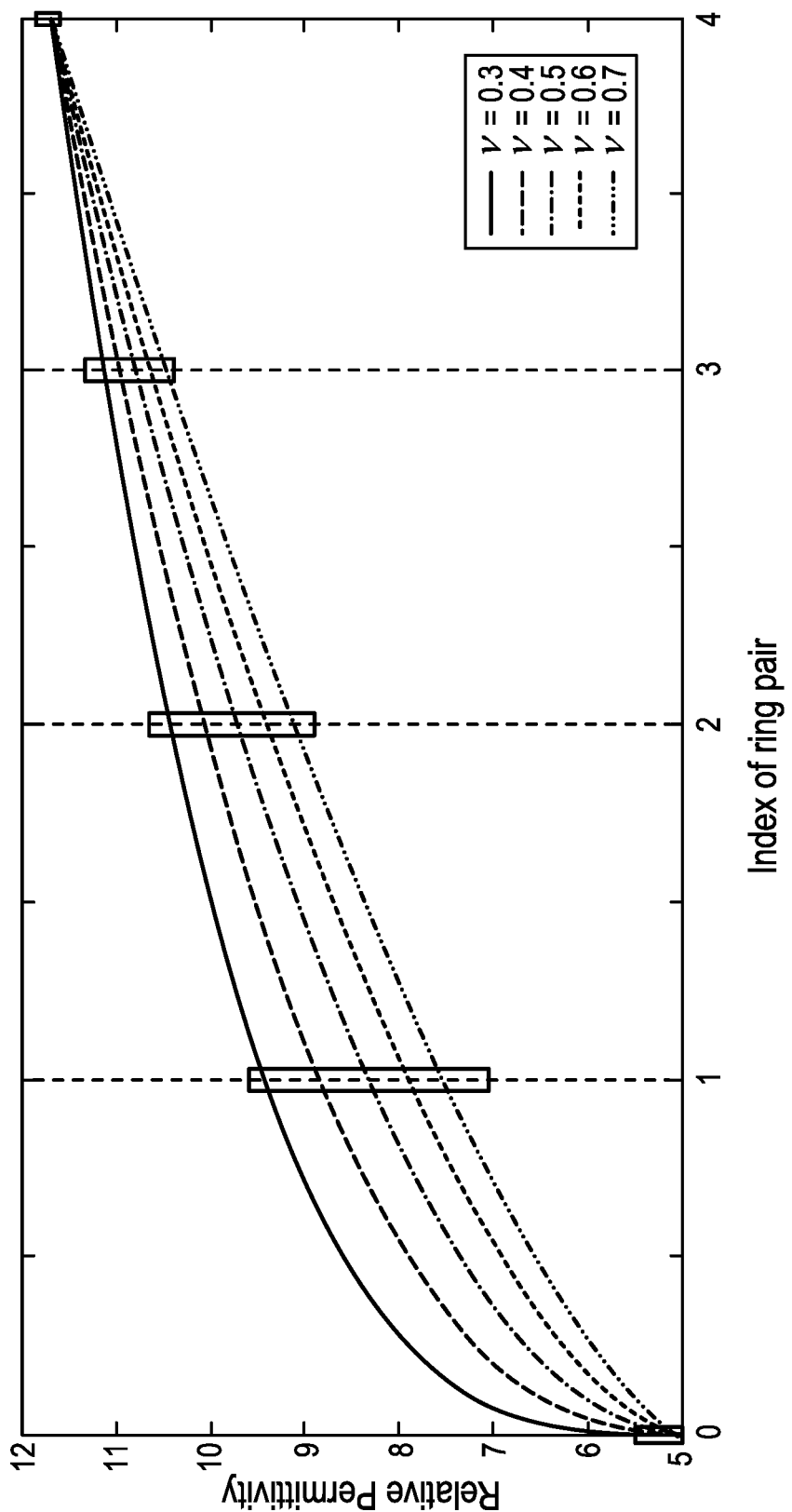
FIG. 8 shows an exemplary plot of relative permittivities of the embodiment of FIG. 1 as a function of decreasing distance to the cylinder axis.
Figure 9:
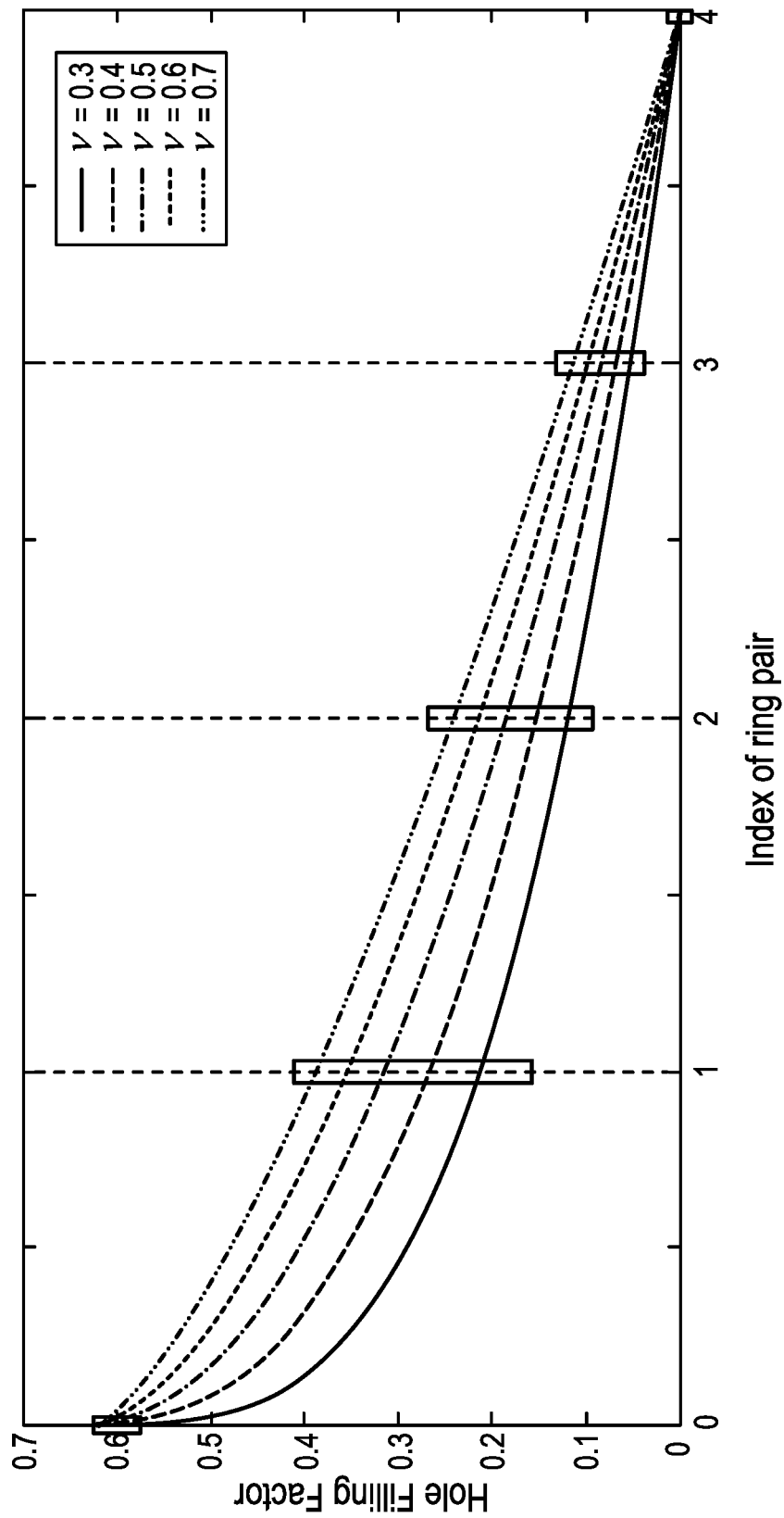
FIG. 9 shows an exemplary plot of hole filing factors of the embodiment of FIG. 1 as a function of decreasing distance to the cylinder axis.

FIG. 8 shows an exemplary plot of relative permittivities, and FIG. 9 shows an exemplary plot of hole filing factors as a function of an index of ring pairs, for the embodiment of FIGS. 1 and 2. A profile of the relative permittivity $\varepsilon_x$ of the lens in radial direction can be determined using the formula $$\varepsilon_x = \varepsilon_1 + (\varepsilon_2 - \varepsilon_1) \cdot \left(\frac{x \cdot w}{r}\right)^v$$

from the relative permittivities $\varepsilon_1$ and $\varepsilon_2$, which are the relative permittivity of air and silicon, respectively, the width of the concentric rings w, the radius of the lens r and the parameter v. The distribution of the hole filling factor ff is calculated by the previously mentioned equation.

The index of ring pairs increases with decreasing distance to the cylinder axis and assumes five discrete values, 0, 1, 2, 3, and 4. Thus, at the value 0 on the abscissa the material properties of the ring pair 40.1 and 40.2, are shown on the ordinate, and at the value 1 on the abscissa the material properties of the ring pair 41.1 and 41.2, etc. are given at the ordinate.

For calculating the plots shown in FIGS. 8 and 9, only for better illustration of the mathematical dependence of the relative permittivities and the hole filling factor, a continuum of index values was used for the abscissa. The relevant values of the relative permittivity and of the hole filling factor are to be found at integer values of the index of ring pairs.

Both figures show curves for five different values of the parameter v, thus representing five different lens designs. Parameter values between 0.3 and to 0.7 are preferred. For that reason, no plots for values of v of 0.8 and greater and smaller than 0.3 are shown. The focal length of the lens depends on the profile of the relative permittivity in the radial direction. Thus, the focal length is tunable by selecting different hole filing factor distributions.

Figure 10:
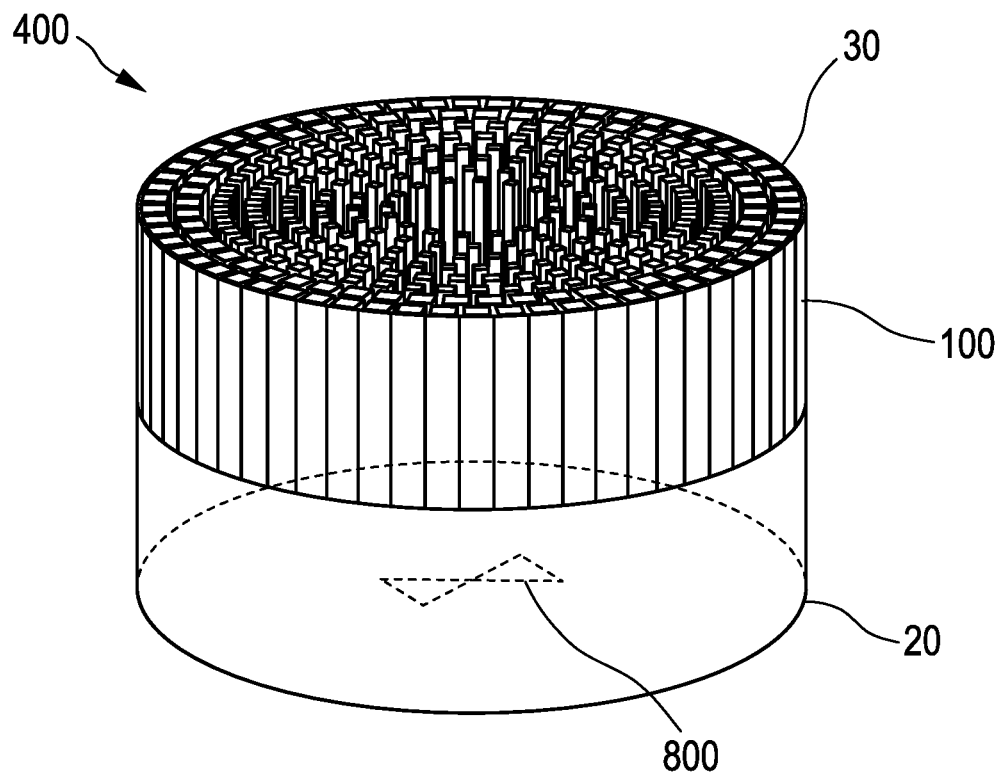
FIG. 10 shows a side-view of an embodiment of a terahertz antenna arrangement.
Figure 11:
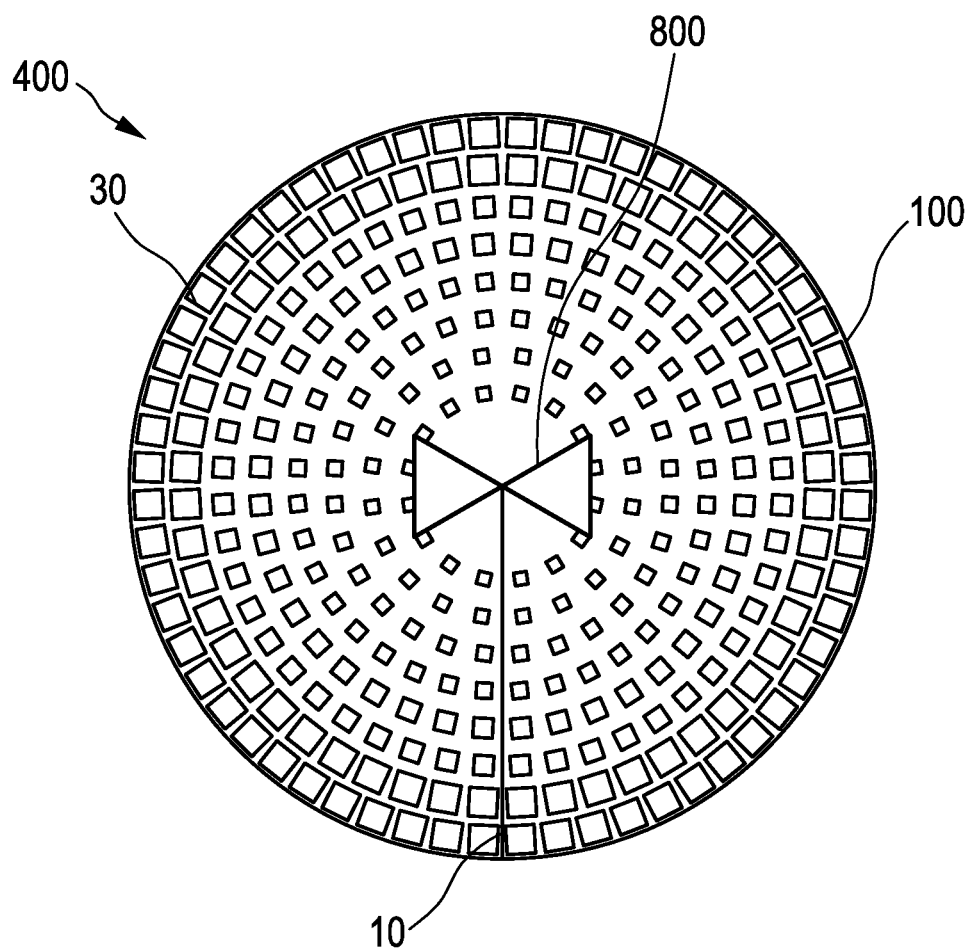
FIG. 11 shows a top-view of the terahertz antenna arrangement of FIG. 10.

FIG. 10 shows a side-view and FIG. 11 a top-view of an embodiment of a terahertz antenna arrangement 400. The terahertz antenna arrangement 400 comprises a terahertz antenna in form of a bow-tie patch antenna 800 and a lens 100 for terahertz radiation as explained in FIGS. 1 and 2. The lens 100 is arranged on the terahertz antenna 800, wherein the back surface 20 of the lens 100 faces the antenna 800. The bow-tie antenna 800 is formed by two triangular-shaped planar metal pieces. The triangular-shaped planar metal pieces are arranged such that one corner of one of the metal pieces is touching one corner of the other of the metal pieces. Typically, the bow-tie patch antenna 800 is smaller in extension than the lens 100.

The lens 100 is arranged on the bow-tie terahertz antenna 800 such that the cylinder axis is positioned above the center of the bow-tie terahertz antenna 800. The center of the bow-tie antenna 800 is defined at the position where the two triangular-shaped planar metal pieces are touching each other.

Figure 12:
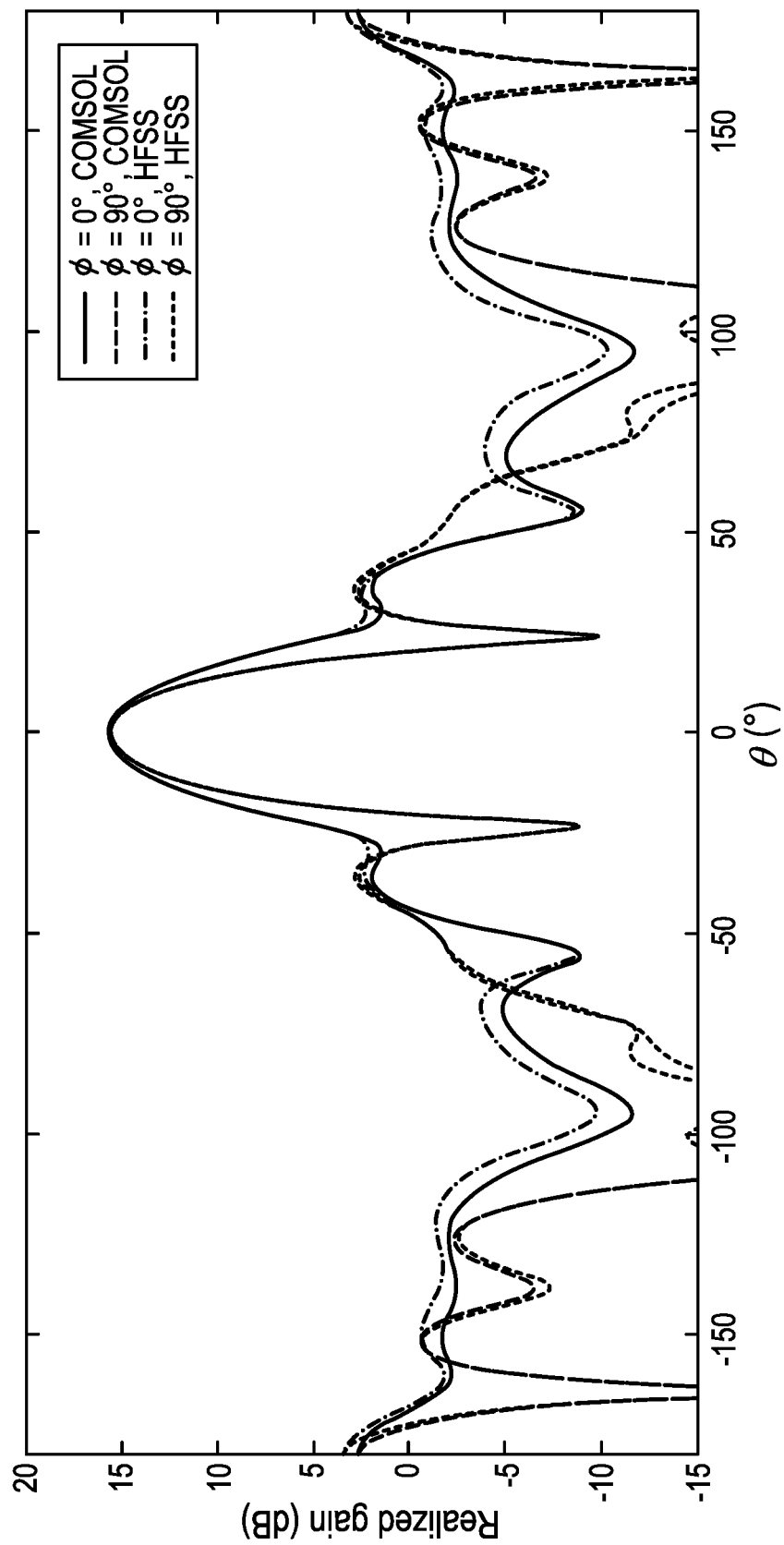
FIG. 12 shows a radiation pattern of the antenna arrangement of FIG. 10 for a first exemplary lens radius.
Figure 13:
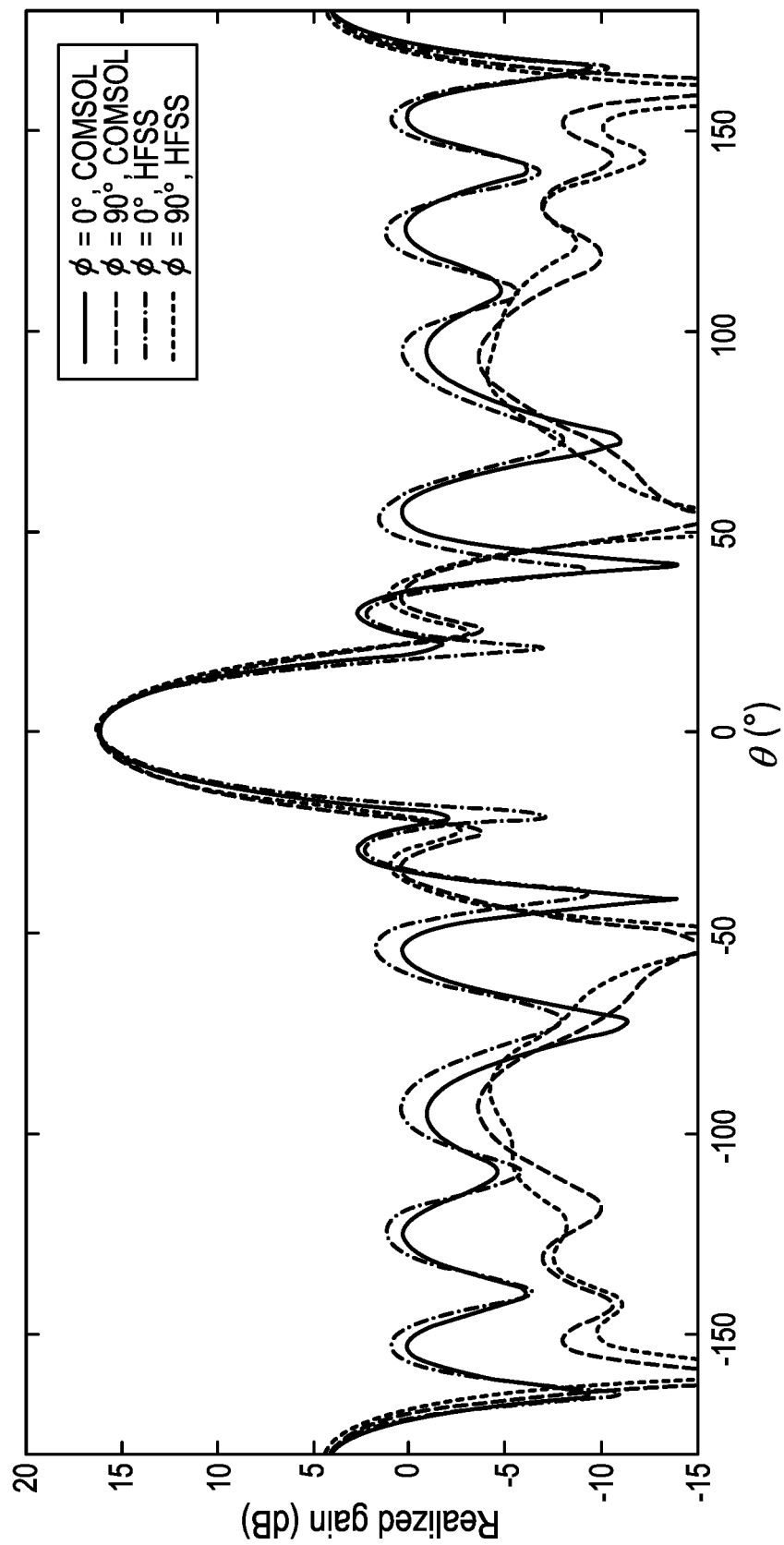
FIG. 13 shows a radiation pattern of the antenna arrangement of FIG. 10 for a second exemplary lens radius.

FIG. 12 and FIG. 13 show a radiation pattern of different embodiments of an antenna arrangement of FIG. 8 for an exemplary lens radius. To obtain the plots, the radiation emitted from the antenna 400 through the lens was simulated using two different software products, namely, the software COMSOL and the software HFSS Both implement a finite element method for simulation. The simulations were made for the E-plane and the H-plane of the radiation. For a linearly-polarized antenna, the E-plane ($\phi=90°$) is the plane containing the electric field vector and the direction of maximum radiation, and the H-plane ($\phi=0°$) is the plane containing the magnetic field vector and the direction of maximum radiation. The radiation pattern is plotted in FIGS. 12 and 13 as realized gain in units of dB as a function of an angle $\vartheta$ in the E-plane. Both simulation methods demonstrate the far field of the patch antenna. The fact that the simulations using different simulation approaches are almost identical demonstrates the correctness of the design and simulation approach.

With regard, to parameters used for the simulations, the lens for terahertz radiation in the simulations of FIG. 12 has a lens radius of 1 mm. The bow-tie antenna of the terahertz antenna arrangement is working at an operating wavelength of 1 mm.

The lens for terahertz radiation in the embodiment of FIG. 13 has a lens radius of 1.1 mm. The bow-tie antenna of the terahertz antenna arrangement is working at an operating wavelength of 1 mm.

Both simulation methods show a pronounced gain peak with a maximum realized gain at $\Theta=0°$ for both E- and H-plane. The maximum realized gain is about 16 dB. The gain for the side lobes and back lobes at angles above 50° and below −50° are under 5 dB. Thus, both simulation methods show that the lens for terahertz radiation focusses almost the whole incoming radiation and not much radiations is lost in other direction—above 50° and below −50°— than the preferred one—between 50° and −50°.

Figure 14:
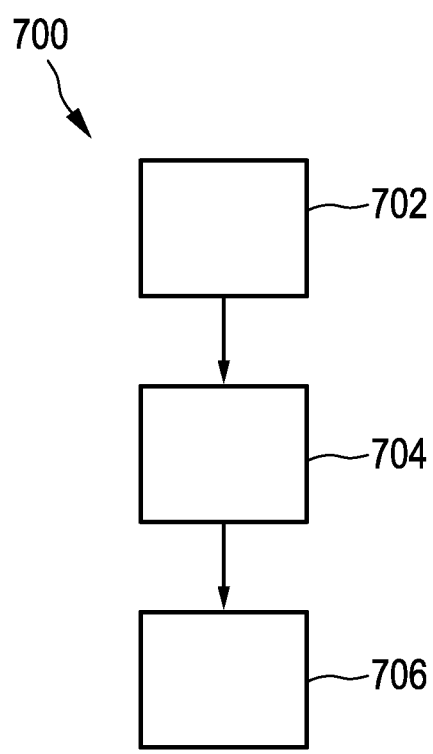
FIG. 14 shows a schematic diagram representing an embodiment of a method for fabricating the lens for terahertz radiation.

FIG. 14 shows a schematic diagram representing an embodiment of a method 700 for fabricating the lens for terahertz radiation. In a first step 702, a cylindrical lens body made of silicon having a planar front surface and a planar back surface is fabricated. Fabricating 702 a cylindrical lens comprises fabricating 704 a silicon metamaterial in a front body region of the lens body. The silicon metamaterial having a relative permittivity that decreases in a lateral direction, with increasing radial distance from a cylinder axis. Fabricating 706 the silicon metamaterial in the front body region comprises fabricating holes that are distributed on the front surface in rings that are concentric with respect to the cylinder axis and at the same time fabricating a back body region.

The holes extend from the front surface to respective hole bottoms at an equal bottom level in a depth direction, which is perpendicular to the front surface. The hole bottoms defining an interface with the back body region. Thus the back body region is immediately adjacent to the front body region. The back body region extends to the back surface and consists of bulk silicon having a laterally constant relative permittivity.

Anisotropic dry etching is used for fabricating holes. A low aspect ratio of 18 between the side length of the perimeter of the holes, between 33.5 μm and 80 μm, and the distance of the bottom level in depth direction from the front surface of 600 μm, make it possible to achieve an equal bottom level in a depth direction for the holes with anisotropic dry etching.

In summary, a lens for terahertz radiation, which can be used in an antenna arrangement, comprises a cylindrical lens body made of silicon having a planar front surface and a planar back surface. The lens body has a front body region which forms a silicon metamaterial with a relative permittivity that decreases in a lateral direction with increasing radial distance from a cylinder axis. A back body region is immediately adjacent to the front body region and extends to the back surface. It consists of bulk silicon having a laterally constant relative permittivity.

The front body region comprises holes that are distributed on the front surface in rings that are concentric with respect to the cylinder axis. The holes extend from the front surface to respective hole bottoms at an equal bottom level in a depth direction. The hole bottoms interface with the back body region.

What is claimed is:
1. A lens for terahertz radiation, comprising:
   a cylindrical lens body made of silicon having a planar front surface and a planar back surface; wherein the lens body has a front body region which forms a silicon metamaterial with a relative permittivity that decreases in a lateral direction, which is parallel to the front surface, with increasing radial distance from a cylinder axis; and a back body region that is immediately adjacent to the front body region, extends to the back surface, and consists of bulk silicon having a laterally constant relative permittivity; and wherein the front body region comprises holes that are distributed on the front surface in rings that are concentric with respect to the cylinder axis, wherein the holes extend from the front surface to respective hole bottoms at an equal bottom level in a depth direction, which is perpendicular to the front surface, the hole bottoms interfacing with the back body region;

wherein the holes have a square-shaped perimeter; and wherein the holes are arranged in the rings in accordance with a two-dimensional lattice structure, wherein the lattice structure is composed of concentric rings divided into ring segments, each ring segment forming a unit cell of the lattice and comprising a single hole arranged concentrically with respect to the given unit cell.

2. The lens according to claim 1, wherein a thickness and a diameter of the lens body are equal.

3. The lens according to claim 2, wherein the thickness and the diameter are between 100 micrometer and 1 millimeter.

4. The lens according to claim 1, wherein a hole filling factor increases in the lateral direction with increasing radial distance from the cylinder axis.

5. The lens according to claim 4, wherein the increase of the hole filling factor in the lateral direction follows the following equation $$1 - \frac{\left\{\left[\varepsilon_1 + (\varepsilon_2 - \varepsilon_1) \cdot \left(\frac{x \cdot w}{r}\right)^v - 1\right]\right\}}{\varepsilon_2 - 1},$$

wherein $\varepsilon_1$ and $\varepsilon_2$ are relative permittivities of air and of bulk silicon material, respectively, x is an ordering number of a given concentric ring among the total set of rings, w is a width of the concentric rings, r is a radius of the lens and v is a parameter between 0.3 and 2.

6. The lens according to claim 1, wherein the holes are arranged in the rings in accordance with a two-dimensional lattice structure, wherein the lattice structure is composed of concentric rings divided into ring segments, each ring segment forming a unit cell of the lattice and comprising a single hole arranged concentrically with respect to the given unit cell.

7. The lens according to claim 6, wherein a thickness and a diameter of the lens body are equal.

8. The lens according to claim 7, wherein the thickness and the diameter are between 100 micrometer and 1 millimeter.

9. A terahertz antenna arrangement, comprising a terahertz antenna and a lens for terahertz radiation according to claim 1 arranged on the antenna, wherein the back surface of the lens faces the antenna.

10. A method for fabricating a lens for terahertz radiation, comprising:

fabricating a cylindrical lens body made of silicon having a planar front surface and a planar back surface; wherein fabricating the lens body comprises fabricating a silicon metamaterial in a front body region of the lens body, the silicon metamaterial having a relative permittivity that decreases in a lateral direction, which is parallel to the front surface, with increasing radial distance from a cylinder axis; wherein fabricating the silicon metamaterial in the front body region comprises fabricating holes that are distributed on the front surface in rings that are concentric with respect to the cylinder axis, wherein the holes extend from the front surface to respective hole bottoms at an equal bottom level in a depth direction, which is perpendicular to the front surface, the hole bottoms defining an interface with a back body region; thus at the same time fabricating the back body region which is immediately adjacent to the front body region, extends to the back surface, and consists of bulk silicon having a laterally constant relative permittivity.

11. The method of claim 10, wherein fabricating a silicon metamaterial in the front body region comprises performing an anisotropic dry etching step for fabricating the holes in the top body region.

* * * * *